(12) United States Patent
Dumont

(10) Patent No.: US 9,532,025 B2
(45) Date of Patent: Dec. 27, 2016

(54) METHOD FOR PRE-PROGRAMMED RECORDING

(75) Inventor: Frank Dumont, Singapore (SG)

(73) Assignee: THOMSON LICENSING, Issy-les-Moulineaux (FR)

( * ) Notice: Subject to any disclaimer, the term of this patent is extended or adjusted under 35 U.S.C. 154(b) by 1114 days.

(21) Appl. No.: 11/329,939

(22) Filed: Jan. 11, 2006

(65) Prior Publication Data

US 2006/0153018 A1 Jul. 13, 2006

(30) Foreign Application Priority Data

Jan. 12, 2005 (EP) .................................... 05300025

(51) Int. Cl.
*G11B 7/00* (2006.01)
*H04N 9/79* (2006.01)
*H04N 5/76* (2006.01)
*H04N 5/782* (2006.01)

(52) U.S. Cl.
CPC .............. *H04N 9/7921* (2013.01); *H04N 5/76* (2013.01); *H04N 5/782* (2013.01)

(58) Field of Classification Search
None
See application file for complete search history.

(56) References Cited

U.S. PATENT DOCUMENTS

| 5,134,579 | A | 7/1992 | Oki et al. |
|---|---|---|---|
| 5,543,933 | A | 8/1996 | Kang et al. |
| 5,619,265 | A | 4/1997 | Suzuki et al. |
| 5,701,383 | A | 12/1997 | Russo et al. |
| 6,157,772 | A | 12/2000 | Kim |
| 6,169,842 | B1 | 1/2001 | Pijnenburg et al. |
| 6,226,447 | B1 | 5/2001 | Sasaki et al. |

(Continued)

FOREIGN PATENT DOCUMENTS

| EP | 0584991 | 3/1994 |
|---|---|---|
| EP | 0802682 | 10/1997 |

(Continued)

OTHER PUBLICATIONS

Search Report Dated May 4, 2005.

*Primary Examiner* — Jason Olson
*Assistant Examiner* — Parul Gupta
(74) *Attorney, Agent, or Firm* — Brian Dorini; Paul P. Kiel

(57) ABSTRACT

The present invention relates to a method for performing pre-programmed recording on a recording medium having insufficient remaining storage space for performing a pre-programmed recording with a specified recording quality, and to an apparatus for reading from and writing to recording media using such method. The method has the steps of:
  determining the storage space required on a recording medium for performing one or more pre-programmed recordings with a specified quality;
  comparing the available storage space on the recording medium with the required storage space; and
  in case the required storage space exceeds the available storage space, reducing the specified recording quality for one or more of the pre-programmed recordings in accordance with settable priority indicators for the pre-programmed recordings such that the required storage space no longer exceeds the available storage space.

9 Claims, 2 Drawing Sheets

(56) References Cited

U.S. PATENT DOCUMENTS

| | | |
|---|---|---|
| 6,311,011 B1 | 10/2001 | Kuroda |
| 6,330,392 B1 * | 12/2001 | Nakatani et al. ............... 386/52 |
| 6,577,811 B1 | 6/2003 | Kikuchi et al. |
| 6,584,272 B1 | 6/2003 | Fukushima et al. |
| 6,601,074 B1 | 7/2003 | Liebenow |
| 6,674,448 B1 | 1/2004 | Garahi et al. |
| 6,678,757 B1 | 1/2004 | Paulus et al. |
| 6,728,753 B1 | 4/2004 | Parasnis et al. |
| 6,847,778 B1 | 1/2005 | Vallone et al. |
| 7,257,308 B2 | 8/2007 | Plourde, Jr. et al. |
| 7,505,673 B2 * | 3/2009 | Kreiner et al. ............... 386/95 |
| 2001/0020943 A1 | 9/2001 | Hijiri et al. |
| 2002/0009289 A1 | 1/2002 | Morishita et al. |
| 2002/0012530 A1 * | 1/2002 | Bruls ........................... 386/109 |
| 2002/0054750 A1 | 5/2002 | Ficco et al. |
| 2002/0172496 A1 | 11/2002 | Gunji et al. |
| 2003/0002581 A1 * | 1/2003 | Moni et al. .............. 375/240.03 |
| 2003/0099460 A1 | 5/2003 | Imada et al. |
| 2004/0126090 A1 | 7/2004 | Naitoh |

FOREIGN PATENT DOCUMENTS

| | | |
|---|---|---|
| EP | 0929072 | 7/1999 |
| EP | 1 168 347 A2 | 1/2002 |
| GB | 2332130 | 6/1999 |
| JP | 6-162646 | 6/1994 |
| JP | 07177463 | 7/1995 |
| JP | 08140029 | 5/1996 |
| JP | 9138698 | 5/1997 |
| JP | 10124955 | 5/1998 |
| JP | 10-208445 | 8/1998 |
| JP | 10-234000 | 9/1998 |
| JP | 11-176144 | 7/1999 |
| JP | 2000324449 | 11/2000 |
| JP | 2000350164 | 12/2000 |
| JP | 2001036904 | 2/2001 |
| JP | 2001197437 | 7/2001 |
| JP | 2001204018 | 7/2001 |
| JP | 2002-84496 | 3/2002 |
| JP | 2002-165186 | 6/2002 |
| JP | 2002-290915 | 10/2002 |
| JP | 3091832 | 11/2002 |
| JP | 2003-123386 | 4/2003 |
| JP | 2003-174613 | 6/2003 |
| JP | 2003272164 | 9/2003 |
| JP | 2003274377 | 9/2003 |
| JP | 2003-309806 | 10/2003 |
| JP | 2004-86288 | 3/2004 |
| KR | 1997-71742 | 11/1997 |
| WO | WO 01/82598 A2 | 11/2001 |

\* cited by examiner

METHOD FOR PRE-PROGRAMMED RECORDING

This application claims the benefit, under 35 U.S.C. §119 of European Patent Application 05300025.3, Jan. 12, 2005.

FIELD OF THE INVENTION

The present invention relates to a method for performing pre-programmed recording in an apparatus for reading from and writing to recording media, and to an apparatus for reading from and writing to recording media using such method.

BACKGROUND OF THE INVENTION

Many audio/video devices such as VCRs (video cassette recorders), DVD-recorders (digital versatile disk), HDD-recorders (hard disk drive), or combinations of these audio/video devices, offer the possibility to schedule recordings, i.e. to specify at which time a recording shall start. Specifically in audio/video devices which record compressed digital a/v data, e.g. DVD-recorders, it is common to provide a choice of different bit rates for recording. The user then has the possibility to record a/v data with a selected recording quality from high quality (high bit rate) to low quality (low bit rate) on the recording medium. The total length of recording varies accordingly from small to large. On a single recording medium a/v data with different recording quality can be mixed. The recording quality can usually be specified at the time of pre-programming the recording, either individually for each recording or generally for all recordings. In case the remaining storage space is not sufficient for recording a pre-programmed recording with the specified recording quality, in some audio/video devices the recording quality is automatically adapted to the available storage space. This adapted recording quality is used for all remaining pre-programmed recordings, which are to be recorded on the same recording medium. This leads to the problem that none of the recordings is recorded with high quality, which might be annoying to the user.

To overcome the above problem JP09-138698 discloses a method for recording sound data, whereby, in case the remaining storage space on a recording medium is not sufficient for a recording with high recording quality, previous recordings are re-recorded on the recording medium with lower recording quality in order to increase the available storage space. The recording quality used for re-recording the previous recordings is determined by a plurality of priority parameters. Though this approach allows to perform the pre-programmed recordings with the desired quality, especially in the case of video data a large amount of time is necessary for re-recording the previous recordings. This can be unpleasant for the user as well.

EP 0929072 discloses a digital recording system using a variable recording rate. If one or more recordings are scheduled, the system checks if these recordings can be performed with the desired bit rate. If the available free space is insufficient, the system reduces the bit rate for at least some of the scheduled recordings based on the order of scheduling.

SUMMARY

It is an object of the invention to propose a further method for performing pre-programmed recording on a recording medium having insufficient remaining storage space for performing a pre-programmed recording with a specified recording quality.

According to the invention, this object is achieved by a method for performing pre-programmed recording, having the steps of:
  determining the storage space required on a recording medium for performing one or more pre-programmed recordings with a specified quality;
  comparing the available storage space on the recording medium with the required storage space; and
  in case the required storage space exceeds the available storage space, reducing the specified recording quality for one or more of the pre-programmed recordings in accordance with settable priority indicators for the pre-programmed recordings such that the required storage space no longer exceeds the available storage space.

When recordings are pre-programmed with specified recording qualities, it is checked if the available storage space on the recording medium is sufficient for performing all pre-programmed recordings with their specified quality. If this is not the case, the recording quality for one or more of the pre-programmed recordings is lowered until the available storage space is sufficient for completing all pre-programmed recordings. The reduction of the recording quality is performed based on one or more priority indicators. Possible priority indicators include the genre of a recording, e.g. movie or news etc. A user is more likely to prefer a high recording quality for a movie or a sports event, while he might accept a lower quality for a news magazine. Instead or in addition to the genre the recording length or the time of day of recording can be used. As there are typical broadcasting times and durations for movies or other types of programs, this information helps to determine the importance of a recording. Further indicators are the type or recording, i.e. single or daily recording, the source of recording, e.g. satellite or cable etc., the recorded channel (news channel, sports channel, movie channel, etc.), or the owner of the recording, i.e. the person who pre-programmed the recording. Of course, other priority indicators are also possible. Advantageously, the priority indicators can be defined and/or adjusted by the user.

Preferably, the available storage space on the recording medium is compared with the required storage space in one or more of a plurality of instances. During pre-programming a recording, it can immediately be checked if the available storage space is sufficient. If this is not the case, the user performing the pre-programming is advantageously requested to either provide a different recording medium, or to specify priority indicators, e.g. be specifying a different recording quality for the currently pre-programmed recording or one or more of the previously pre-programmed recordings. The same applies when the recording medium is exchanged by the user. In this case it may happen that on the new recording medium the available storage space is no longer sufficient. The user should then be asked for the priority indicators. Alternatively, the available storage space can also be checked shortly before initiating a pre-programmed recording. In this case, as the user will usually not be available for specifying different recording qualities or changing the recording medium, the recording qualities are automatically determined based on the available priority indicators. A further instance for checking the available storage space is when a non-pre-programmed recording is finished. If the user starts an immediate recording, it is usually not known in advance how much storage space this recording will need. Therefore, when the non-pre-programmed recording is finished it is preferably checked if the remaining storage space still is sufficient for the pre-programmed recordings.

Favorably, the originally specified recording quality is stored in a memory when the recording quality of a pre-programmed recording is reduced. This allows to later restore the originally specified recording quality for one or more of the pre-programmed recordings when it is determined that the available storage space has been increased. This can happen, for example, when the recording medium is exchanged, when the user deletes a previously recorded program, or when the user modifies one or more of the pre-programmed recordings.

Preferably, the specified recording quality for a pre-programmed recording currently being performed is reduced upon receiving an indication that the actual recording length exceeds the pre-programmed recording length. For example, many broadcasters emit a VPS signal (Video Programming System) for controlling pre-programmed recordings. If it is determined that a program such as a life event exceeds the pre-programmed recording time, the recording quality is reduced in order to minimize the effect on the remaining storage space.

Advantageously, a method according to the invention is used in an apparatus for reading from and writing to recording media for performing pre-programmed recording on a recording medium.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures.

DETAILED DESCRIPTION OF PREFERED EMBODIMENTS

Figure 1:
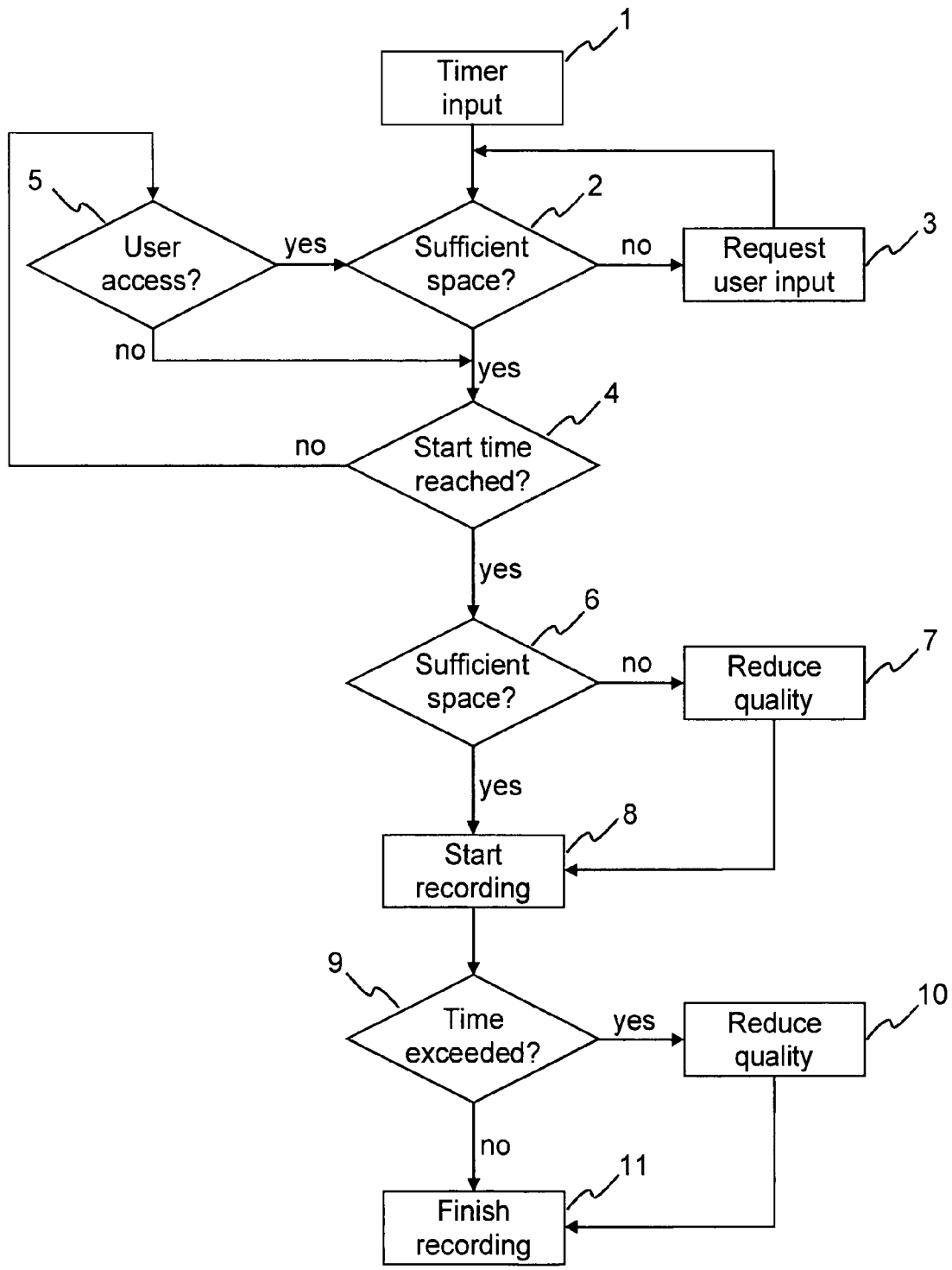
FIG. 1 depicts a method for performing pre-programmed recording according to the invention, and FIG. 2 schematically shows an apparatus for reading from and writing to recording media using the method according to the invention.

In FIG. 1 a method for performing pre-programmed recording according to the invention is depicted. When a user inputs 1 a timer, i.e. when the user schedules a pre-programmed recording, it is immediately checked 2 if the available storage space on the recording medium, on which the program is to be recorded, is sufficient for recording all pre-programmed recordings with their specified recording quality. If this is not the case, the user is requested 3 to input adapted priority indicators, or to provide a different recording medium. Alternatively he might also delete one or more previous or pre-programmed recordings. It is then again checked if the available storage space is sufficient. Instead of requesting 3 the user for input, it is likewise possible to automatically adapt the recording quality to the available storage space as described later on. As long as the start time of a pre-programmed recording is not yet reached 4, it is constantly checked 5 for different types of user accesses. For example, user access can consist in performing a non-pre-programmed recording, in changing the recording medium, or in deleting one or more previous or pre-programmed recordings. In any of these cases it is tested 2 if the available storage space is sufficient. When the start time of a pre-programmed recording is reached 4, it is once again determined 6 if the available storage space is sufficient. If this is not the case, the recording quality of at least one of the pre-programmed recordings is reduced 7. This can be the current recording or any pre-programmed recording starting later. After the recording operation has started 8, it is analyzed 9 if the actual recording length exceeds the pre-programmed length, e.g. due to overtime in a life event etc. When this happens the recording quality is reduced 10 until the recording operation is finished 11.

In the example in FIG. 1 the available storage space is checked 2, 6 at different instances. This takes into account that at some instances the user can be asked 3 to provide further input, while at other instances this is not feasible. Of course, it is likewise possible to only check 6 the available storage space immediately before starting 8 a recording, or just after receiving 1 a timer input.

Figure 2:
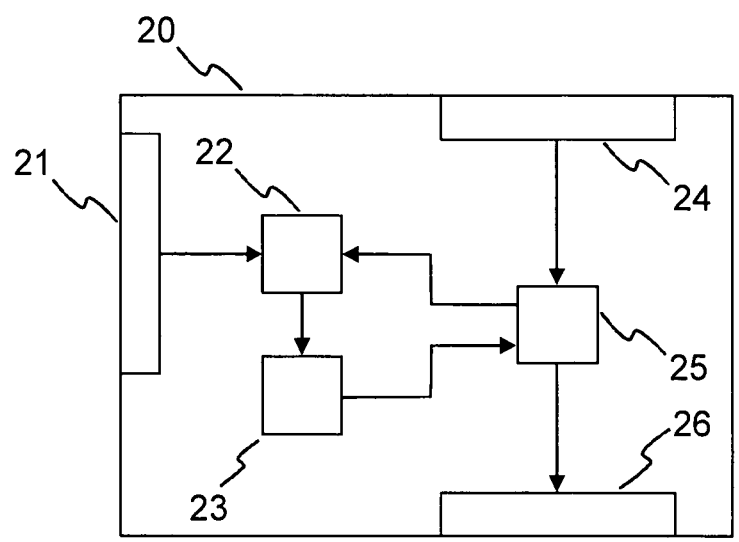

FIG. 2 schematically shows an apparatus 20 for reading from and writing to recording media capable of performing the method according to the invention. An a/v signal is received at an input 21 and relayed to a recording unit 23 via a coding unit 22 for coding or recoding the received a/v signal with a specific bit rate. The apparatus 20 has a user interface 24 for receiving, inter alia, timer information from a user. The received timer information is stored in a memory of a timer processing block 25. The timer processing block calculates the necessary storage space on a recording medium for performing all pre-programmed recordings with their specified quality, and receives information from the recording unit 23 on the available storage space on the currently loaded recording medium. It then compares the required storage space with the available storage space. In case the available storage space is not sufficient, the timer processing block 25 informs the user accordingly via a display 26. The user can then enter priority indicators for one or more of the pre-programmed recordings via the user interface 24. Without user input, the timer processing block 25 reduces the quality of at least one of the pre-programmed recording in accordance with the available priority indicators. When a pre-programmed recording is started, the timer processing block 25 informs the coding unit 22 about the bit-rate to be used for coding or recoding the a/v signal. The coded a/v signal is then recorded by the recording unit 23.

What is claimed is:

1. A method for performing pre-programmed recording of two or more pre-programmed recordings, each pre-programmed recording having an associated specified recording bit rate, the method comprising:

determining the storage space required on a recording medium for performing the two or more pre-programmed recordings with the specified recording bit rate;

before starting recording of a first pre-programmed recording, comparing the available storage space on the recording medium with the required storage space;

in case the required storage space exceeds the available storage space, retrieving for each pre-programmed recording a user-settable priority indicator associated with the pre-programmed recording;

reducing the specified recording bit rate for one or more of the pre-programmed recordings taken as a whole, based on a priority basis in accordance with the retrieved user-settable priority indicators such that the required storage space no longer exceeds the available storage space; and starting recording of the first pre-programmed recording.

2. The method according to claim 1, wherein the available storage space on the recording medium further is compared with the required storage space during pre-programming of a recording when the recording medium is exchanged, and/or when a non-pre-programmed recording is finished.

3. The method according to claim 1, wherein the originally specified recording bit rate of a pre-programmed recording is stored in a memory before starting recording of said pre-programmed recording when the recording bit rate of said pre-programmed recording is reduced.

4. The method according to claim 3, wherein the originally specified recording bit rate is restored for at least one of the pre-programmed recordings before starting recording of the at least one of the pre-programmed recordings when it is determined that the available storage space has been increased.

5. The method according to claim 1, further including the step of requesting a user to specify user-settable priority indicators for one or more of the pre-programmed recordings.

6. The method according to claim 1, further including the step of reducing the specified recording bit rate for a pre-programmed recording currently being performed upon receiving an indication that the actual recording duration exceeds the pre-programmed recording duration.

7. The method according to claim 1, wherein the user-settable priority indicators for the pre-programmed recordings include at least one of genre of a recording, recording duration, time of day of recording, type of recording, source of recording, recorded channel, or owner of recording.

8. The method according to claim 1, wherein the user-settable priority indicators for the pre-programmed recordings priority are adjustable by a user.

9. An apparatus for reading from and writing to recording media, including means for performing a method according to claim 1 for performing pre-programmed recording of two or more pre-programmed recordings on a recording medium.

* * * * *